United States Patent
Haimerl et al.

(10) Patent No.: US 11,427,061 B2
(45) Date of Patent: Aug. 30, 2022

(54) TOP FOR A CONVERTIBLE VEHICLE COMPRISING A FRONT BOW AND A HEADLINER

(71) Applicant: Webasto SE, Stockdorf (DE)

(72) Inventors: Alexander Haimerl, Stockdorf (DE); Heinrich Wüllrich, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 17/186,328

(22) Filed: Feb. 26, 2021

(65) Prior Publication Data
US 2021/0276403 A1    Sep. 9, 2021

(30) Foreign Application Priority Data
Mar. 4, 2020 (DE) ...................... 10 2020 105 823.3

(51) Int. Cl.
*B60J 7/12* (2006.01)
*B60R 21/04* (2006.01)
*B60R 21/00* (2006.01)

(52) U.S. Cl.
CPC .............. *B60J 7/1239* (2013.01); *B60R 21/04* (2013.01); *B60R 2021/0072* (2013.01)

(58) Field of Classification Search
CPC ...... B60J 7/1239; B60J 7/1851; B60J 7/0023; B60R 2021/0072
USPC .................................................... 296/107.06
See application file for complete search history.

(56) References Cited

U.S. PATENT DOCUMENTS

| 5,884,964 | A | * | 3/1999 | Roeper ................... B60J 7/1239 |
| | | | | 296/187.05 |
| 6,318,791 | B1 | | 11/2001 | Pfertner |
| 8,523,267 | B2 | * | 9/2013 | Herz ...................... B60J 7/1234 |
| | | | | 296/187.05 |
| 2007/0164584 | A1 | | 7/2007 | Liedmeyer et al. |

FOREIGN PATENT DOCUMENTS

| DE | 19921305 A1 | 11/2000 | |
| DE | 10357100 A1 | 6/2005 | |
| DE | 10201105731 A1 * | 6/2013 | ............ B60J 7/1239 |
| DE | 102020207729 A1 * | 12/2020 | ............ B60J 7/1239 |
| EP | 1473180 A2 * | 8/2003 | ............ B60J 7/1239 |

OTHER PUBLICATIONS

Machine Translation of EP1473180A2, printed from the EPO website Apr. 9, 2022.*
Machine Translation of DE102011056731A1, printed from the EPO website Apr. 9, 2022.*

* cited by examiner

*Primary Examiner* — Jason S Morrow
(74) *Attorney, Agent, or Firm* — Fitch, Even, Tabin & Flannery, LLP

(57) ABSTRACT

A top for a convertible vehicle, the top having a top linkage displaceable between a cover and storage position, and which may have a front bow forming a front edge of the top when the top is in the cover position and accommodating a front lock by which the front bow can be fastened to a front header of the vehicle when the top is in the cover position, and the top having a headliner, the front bow having an upper bow shell to which a drive of the front lock is attached and whose upper side is covered by a top cover. The front bow may have a lower bow shell extending at least largely across the width of the front bow in the transverse direction of the top and whose underside is fully covered by the (Continued)

headliner and defines the shape of the headliner with its entire surface.

8 Claims, 3 Drawing Sheets

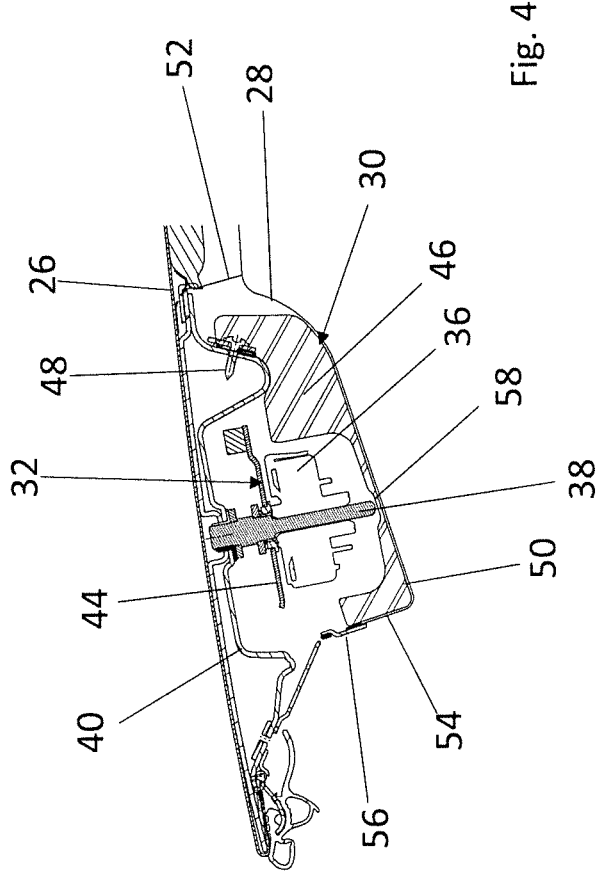

TOP FOR A CONVERTIBLE VEHICLE COMPRISING A FRONT BOW AND A HEADLINER

CROSS-REFERENCE TO RELATED APPLICATION

This application claims priority from German Patent Application Number DE 10 2020 105 823.3, filed Mar. 4, 2020, which is hereby incorporated herein by reference in its entirety for all purposes.

FIELD

The invention relates to a top of a convertible vehicle, the top having the features of the preamble of claim 1.

BACKGROUND

A top of this kind is known from practice and is a displaceable roof of a convertible vehicle. The top is displaceable between a cover position, in which a vehicle interior is covered, and a storage position, in which the vehicle interior is uncovered and the top is stored in a top storage box at the rear of the vehicle in question. For being displaced, the top comprises a top linkage which has a link arrangement on either side of a vertical longitudinal center plane of the top, each link arrangement being mounted in a pivotable manner on a main bearing attached to the vehicle. A front bow which can be fastened to a front header of the convertible vehicle to secure the cover position extends between the bilaterally disposed link arrangements. A top cover made of a foldable, weather-proof fabric can be deployed by means of the top linkage. A headliner is disposed on its inside, which forms the visible surface of the top visible from the vehicle interior when the top is in the cover position. The front bow accommodates a front lock for fastening the front bow to the front header. An underside of a drive of the front lock is provided with a cover or casing which forms a dome protruding in the direction of the vehicle interior and having a visible surface visible from the vehicle interior. At its edges, the cover is limited by the headliner. However, the transition between the cover and the headliner often fails to satisfy design-related demands.

SUMMARY

The object of the invention is to provide a top of the kind described above which is characterized by a harmonious optical appearance on its inner side in the area of the front bow.

According to the invention, this object is attained by the top having the features of claim 1.

So, according to the invention, a top for a convertible vehicle is proposed which has a front bow accommodating a front lock attached to an upper bow shell. At the bottom, the front lock is covered by a lower bow shell which essentially extends across the entire width of the front bow and which stretches at least almost as far as to the lateral edges thereof. An underside of the lower bow shell is fully covered by the headliner, which can be made of a foldable and formable fabric. At the same time, the underside of the lower bow shell, which itself is not a visible surface of the top, defines the shape of the headliner with its entire surface. So the design and the shape of the lower bow shell determines the shape of the headliner in the area of the front bow of the top. In this way, an optically pleasing appearance without any potentially disruptive material transitions can be realized at the inner side of the top.

In particular, the lower bow shell can have an underside whose curvature in the longitudinal direction of the top is at least largely constant across the width of the lower bow shell, which means that there are no abrupt changes in shape.

In a preferred embodiment of the top according to the invention, the lower bow shell has a front end face which extends between the lateral edges of the front bow and which is covered by the headliner. The front end face can have a curvature which corresponds to the curvature of a front header of the vehicle in question, allowing it to border the front header with a constant clearance when the top is in the cover position.

The headliner, which is advantageously made of a foldable fabric, can be loosely stretched across the underside of the lower bow shell or can be fully or partially connected to the underside of the lower bow shell. For example, the headliner is glued to the lower bow shell. However, it is also conceivable for the lower bow shell to be formed integrally on the headliner by a shaping process, such as an injection molding process or a foaming process.

In a preferred embodiment of the top according to the invention, at least part of the lower bow shell is made of a plastic material.

In a specific embodiment of the top according to the invention, at least part of the lower bow shell is made of a foam material.

Advantageously, the lower bow shell is fixed to the upper bow shell by means of screws, rivets, latching pins, latching strips or the like, for example.

In order to also be able to ensure emergency operation of the front lock in case of failure of a front lock drive, the lower bow shell has a material tapering or a recess aligned with an axis of a drive shaft of the front lock. In case of emergency, the headliner covering the material tapering or the recess can be pierced, allowing a tool to engage the drive shaft and the drive shaft to be turned so as to operate the front lock.

The upper bow shell, which in particular forms a continuous surface on which the fabric of the top cover fully rests, can be produced in various ways and comprise a composite component having a honeycomb structure, aluminum elements and/or the like, for example. In any case, the upper bow shell has a socket to which the front lock can be attached. The lower bow shell preferably has no load-bearing function for the front lock.

The invention also relates to a convertible vehicle comprising a top of the kind described above.

Other advantages and advantageous configurations of the subject matter of the invention are apparent from the description, the drawing and the claims.

An example of an embodiment of a convertible vehicle having a top according to the invention is illustrated in a schematically simplified manner in the drawing and will be explained in more detail in the following description.

BRIEF DESCRIPTIONS OF THE DRAWINGS

FIG. 4 is a section through the top along line IV-IV in FIG. 3.

DETAILED DESCRIPTION

Figure 1:
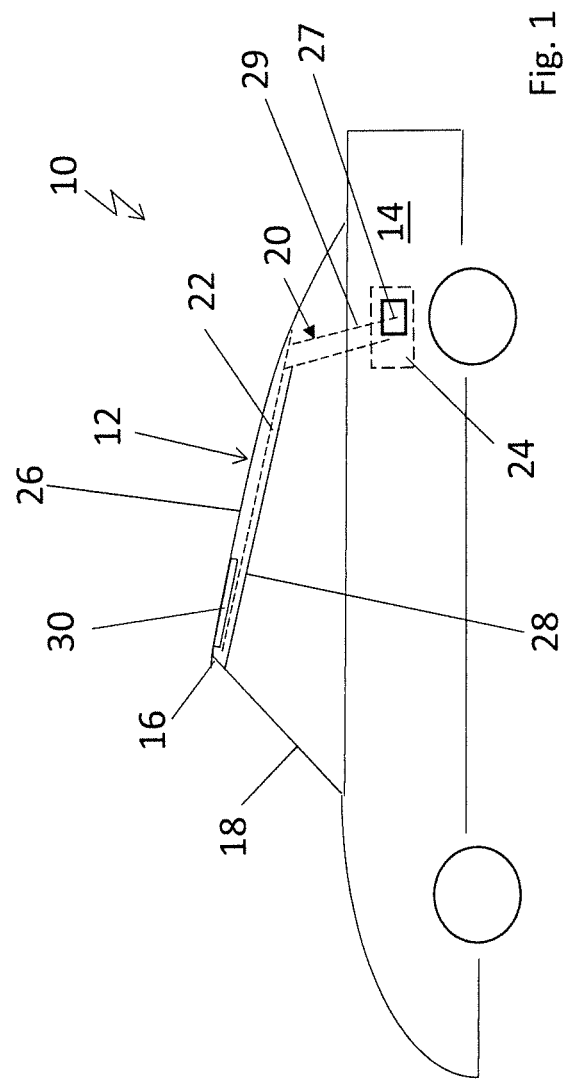
FIG. 1 is a schematic side view of a convertible vehicle having a top according to the invention.
Figure 3:
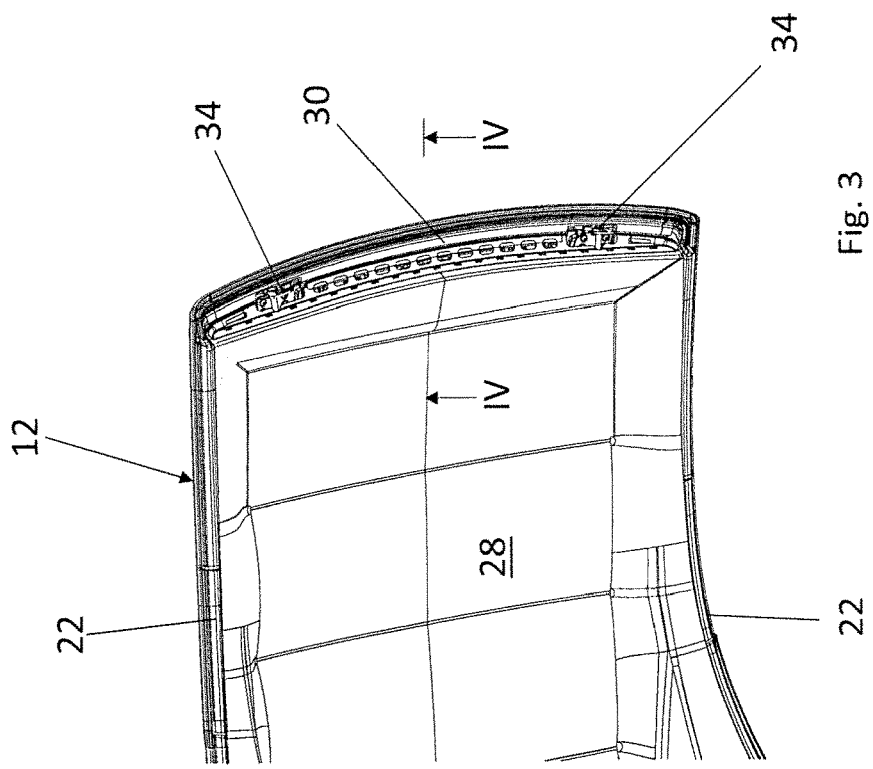
FIG. 3 is a perspective bottom view of the top in its front end portion.

FIG. 1 shows a motor vehicle 10 which is realized as a convertible vehicle and equipped with a folding top 12 which forms a vehicle roof and which can be displaced between a cover position, which is illustrated in FIG. 1 and in which a vehicle interior is covered, and a storage position (not shown), in which the vehicle interior is uncovered and in which folding top 12 is stored in a top storage space 14 at the rear of motor vehicle 10. When folding top 12 is in the cover position, a front edge of folding top 12 is fastened to a front header 16 forming an upper leg of a frame of a windshield 18, said upper leg extending in the transverse direction of motor vehicle 10.

Figure 2:
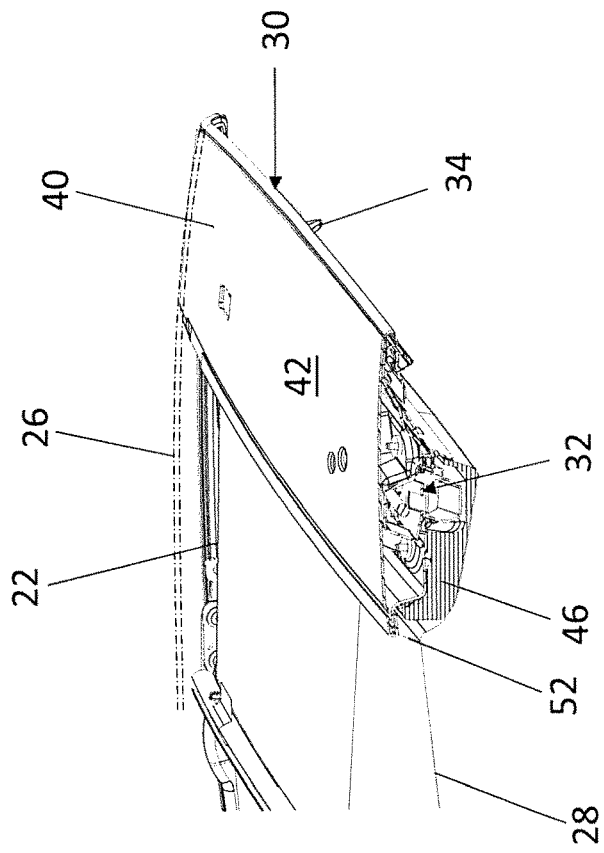
FIG. 2 is a perspective sectional view of a front end portion of the top in the area of a front bow.

For being displaced, folding top 12 comprises a top linkage 20 having a link arrangement 22 on either side of a vertical longitudinal center plane of folding top 12, each link arrangement 22 being mounted in pivotable manner on a respective main bearing 24 attached to the body or the vehicle. A top cover 26, which is indicated by a dashed line in FIG. 2, can be deployed by means of top linkage 20. For driving top linkage 20, folding top 12 has respective drive units 27 on bilaterally disposed main bearings 24, each drive unit 27 driving a main link 29 of respective link arrangement 22, each main link 29 being mounted in a pivotable manner on respective main bearing 24. Drive units 27 can be hydraulic drives or electric drives.

At its inner side, which faces the vehicle interior when folding top 12 is in the cover position, folding top 12 has a headliner 28 made of a foldable liner fabric and forming the inner visible surface of folding top 12.

Top linkage 20 comprises a front bow 30 extending between bilaterally disposed link arrangements 22 and forming a front edge of folding top 12, said front edge being in contact with front header 16 via a weather strip arrangement when folding top 12 is in the cover position.

Front bow 30 accommodates what is referred to as a front lock 32, which comprises two latch hooks 34 which can engage mating latch elements formed on front header 16 in order to fasten front bow 30 to front header 16.

For driving latch hooks 34, front lock 32 has an electric drive motor 36 driving a drive shaft 38 coupled to latch hooks 34 via link arrangements (not shown).

Front bow 30 comprises an upper bow shell 40 which can be made of a material composite comprising metal sheets and/or plastic components and which forms an essentially continuous support surface 42 for top cover 26, top cover 26 forming an outer skin of folding top 12. Furthermore, upper bow shell 40 has a bearing sheet 44 to which drive motor 36 of front lock 32 is attached from below and which is penetrated by drive shaft 38.

At its underside, front bow 30 has a lower bow shell 46 made of a foam material and connected to upper bowl shell 40 via connecting elements 48, which can be screws, rivets or the like. Lower bow shell 46, which is a crash protection element, extends at least largely across the entire width of front bow 30 between bilaterally disposed link arrangements 22. An underside 50 of lower bow shell 46 forms a contact surface for headliner 28. Underside 50 is fully covered by headliner 28 and defines the shape of headliner 28 in the area of front bow 30, underside 50 having an at least largely constant curvature across the extension of lower bow shell 46 in the transverse direction of folding top 12. In the area of the rear edge of front bow 30, headliner 28 is connected to upper bow shell 40 by a tie 52. Starting from tie 52, headliner 28 is guided across underside 50 to a front end face 54 of lower bow shell 46, which means that the latter is also covered by headliner 28 across the width of front bow 30 in the transverse direction of folding top 12. The front edge of headliner 28 is held by fixing means 56. End face 54 has a curvature in the transverse direction of folding top 12 which corresponds to the curvature of front header 16.

A material tapering 58 aligned with the axis of drive shaft 38 is formed on lower bow shell 46. This allows drive shaft 38 to be emergency-operated in the event that drive motor 36 fails. For this purpose, headliner 28 and material tapering 58 can be pierced with a tool, allowing the tool to engage a tool socket, such as a hexagon socket or the like, formed on drive shaft 38. Then drive shaft 38 can be manually turned by means of the tool.

The invention claimed is:

1. A top for a convertible vehicle, the top comprising:
   a top linkage displaceable between a cover position, in which a vehicle interior is covered, and a storage position, in which the vehicle interior is uncovered, and which comprises a front bow forming a front edge of the top when the top is in the cover position and accommodating a front lock by which the front bow can be fastened to a front header of the convertible vehicle when the top is in the cover position, and
   the top comprising a headliner, the front bow comprising an upper bow shell to which a drive of the front lock is attached and whose upper side is covered by a top cover,
   wherein the front bow comprises a lower bow shell which extends at least largely across the width of the front bow in the transverse direction of the top and
   whose underside is fully covered and in contact with the headliner and defines a surface shape of the headliner.

2. The top according to claim 1, wherein the lower bow shell has a front end face which extends across the width of the front bow in the transverse direction of the top and which is covered by the headliner.

3. The top according to claim 1, wherein that the lower bow shell is fixed to the upper bow shell.

4. The top according to claim 1, wherein at least part of the lower bow shell is made of a plastic material.

5. The top according to claim 1, wherein characterized in that at least part of the lower bow shell is made of a foam material.

6. The top according to claim 1, wherein the lower bow shell is a crash protection element.

7. The top according to claim 1, wherein the lower bow shell has a material tapering or a recess covered by the headliner and aligned with an axis of a drive shaft of the front lock.

8. A convertible vehicle comprising a top according to claim 1.

* * * * *